April 17, 1934.   K. MORSBACH ET AL   1,955,557
MOTION PICTURE APPARATUS AND PARTICULARLY AN IMPROVED FILM FEEDING DEVICE
Original Filed Jan. 25, 1932
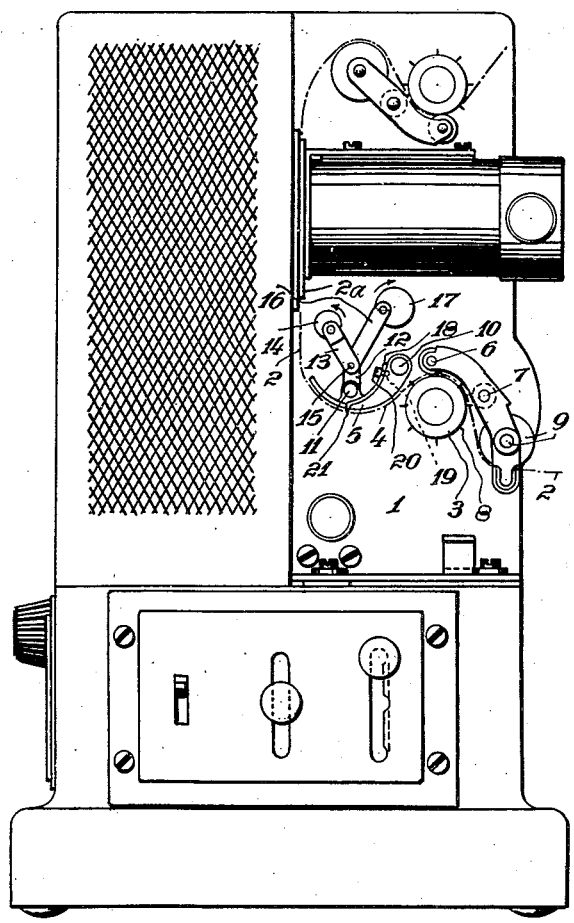
INVENTORS
KURT MORSBACH
OTTO STEINER
ERICH LÖLKES
BY
ATTORNEYS.

Patented Apr. 17, 1934

1,955,557

UNITED STATES PATENT OFFICE 1,955,557

MOTION PICTURE APPARATUS AND PARTICULARLY AN IMPROVED FILM FEEDING DEVICE

Kurt Morsbach, Berlin-Grunewald, Otto Steiner, Berlin-Spandau, and Erich Lölkes, Berlin-Siemensstadt, Germany, assignors to Siemens & Halske, Aktiengesellschaft, Siemensstadt, near Berlin, Germany, a corporation of Germany Original application January 25, 1932, Serial No. 588,512. Divided and this application October 20, 1933, Serial No. 694,402. In Germany January 27, 1931

4 Claims. (Cl. 88—18.6)

Our invention relates to motion-picture apparatus and particularly to an improved film feeding device.

The main object of the invention resides in the provision of an intermittent feed mechanism which on the one hand prevents tearing of the film and on the other hand permits the provision of a low feed ratio. By "feed ratio" is meant the ratio of the time during which the forward feed of the film band by the extent of one picture takes place to the time occupied by the feed cycle. For example, if eight pictures are projected in one second, the time occupied by the feed cycle amounts to ⅛ of a second, and if the forward feed of the film band to the extent of one picture occupies 1/40 of a second with a given mechanism, the feed ratio is shown by the value, 1/40:⅛, or 1:5. By reducing the feed ratio, for example, from 1:5 to 1:8 the time occupied by the actual feeding will be reduced and the time available for the actual projection of a single picture will be proportionally increased (from ⅛–1/40 of a second to ⅜–1/64 of a second in the example given above). As the illumination of the projected picture is better when the time of actual projection is longer, it is necessary in order to obtain the best results to select a low feed ratio. However, in view of the straining imposed on the film, the reduction of the feed ratio is limited, that is to say, in order to attain a low feed ratio without imposing too great a strain on the film, a special construction of the film feed apparatus is necessary.

Other objects and advantages will appear from the following specification wherein reference is made to the accompanying drawing, which shows a side elevation of a motion picture projector embodying our invention.

In the projector 1 the film 2 issuing from the gate 2a forms in the usual manner, between the said gate and the take-up sprocket 3, a loop 4 positioned below the curved lower face of the feed member or beater 5. By means of spring-pressed rollers 6 and 7, the perforations of the film strip 2 are kept in engagement with the teeth 8 of the take-up sprocket 3.

At the rear of the take-up sprocket 3, the film 2 passes over a guide roller 9 to the winding-on spool (not shown). The feed member 5 is rotatably carried on a fixed pivot 10 and in length and curvature of its face corresponds to the loop of the film between the gate and the take-up sprocket which the film assumes immediately before the commencement of the feed movement. Approximately at the centre of the feed member there is firmly connected by means of a pivot 11 a connecting rod consisting of two parts 12 and 13, the part 13 being connected to and driven by a crank 14. At the connecting point 15 of the two parts 12 and 13 of the connecting rod, there is pivotally attached a further connecting rod 16 which in turn is connected to and driven by a crank 17. In this manner the distance between the ends of said first connecting rod consisting of the parts 12 and 13 is periodically altered. Under the action of the aforesaid drive, the feed member 5 carries out a rocking movement about its pivot 10. The two cranks 14 and 17 are rotated in opposite directions as shown by the arrows and at different speeds.

By this method idle strokes are interposed between the actual feed strokes of the beater 5 that is to say, strokes the amplitude of which is less than that of the feed strokes, so that the beater does not come in contact with the film band during these idle strokes. The mutual arrangement of all the parts is such that the feed member only comes into contact with the film when the crank 14 and the crank 17 move simultaneously with their crank pins at about the lowest part of their path of movement.

The path of movement of the feed member 5 is determined by various conditions, viz., the ratio of the speeds and the direction of rotation of the two cranks 14 and 17; by the length of the parts 12 and 13 and of the connecting rod 16; by the position of the point of connection 11 with respect to the pivot 10; and finally by the mutual position of all the axes of rotation with respect to each other. The feed ratio is essentially determined by the ratio of the angular velocities of the two cranks 14, 17. If the duration of one complete rotation of the crank 17 corresponds to the picture duration and the crank 14 rotates three times as quickly as the crank 17 the feed ratio approximates to the value 1:6.

Actuation of the feed member 5 by means of the two cranks 14 and 17 and the connecting rods associated therewith affords the advantage that, as may be readily seen, for example, from a graphical investigation, the speed of the said member 5 during the feed stroke gradually increases approximately in accordance with a sine line to the maximum and also returns gradually to zero. A forward feed movement which starts jerkily and consequently exerts too great a strain on the film is thereby avoided.

When using a low feed ratio and a beater as the feed member for the intermittent forward movement of the film, certain difficulties are encountered in producing an accurate positioning of the picture. For the purpose of ensuring such a condition the beater 5 is provided with a tooth 21 projecting beyond the feed surface of the beater, and adapted to engage in the perforations of the film band during the feed strokes of the beater. In this case the beater 5 and the take-up sprocket 3 are so constructed and positioned, that the part of the film band bearing against the beater during the feed stroke of the latter, executes, with respect to the beater, a relative displacement which is very small per se. The tooth 21 is connected at such a point that it comes into operation, that is to say, it presses against one edge of the perforation in question, only towards the end of the feed stroke of the beater. The actual feeding of the film band thus takes place without the co-operation of the tooth, which only provides for the exact positioning of the picture.

The tooth 21 is formed at the end of a plate 18 which is adjustably attached to the feed member 5 by means of a slot 19 in said plate within which engages a screw 20. The plate 18 is forked at its outer end to form two teeth 21 which are arranged on either side of the feed member 5 in such manner that one tooth co-operates with one series of perforations in the film and the other tooth with the other series.

Having thus described our invention, what we claim as new and desire to secure by Letters Patent is:

1. In a motion-picture apparatus, a film-feeding device, including a pivoted member adapted to feed the film by periodically lengthening a loop portion of the film, said member being provided with a tooth projecting beyond the film-feeding surface of said member and adapted to enter into a perforation of the film during the feeding movement of said member, said tooth being located at such a point of the said member as to enter into action only toward the end of each feeding movement thereof.

2. In a motion-picture apparatus, a film-feeding device, including a member pivoted about a stationary axis and adapted to feed the film by periodically lengthening a loop portion thereof, crank means for actuating said member, a push member one end of which is pivotally connected with said crank means while its other end is pivotally connected with said feeding member at a distance from its pivot axis, said push member consisting of a plurality of parts movable relatively to each other, and means for altering periodically the distance between the ends of said push member.

3. In a motion-picture apparatus, a film-feeding device, including a member pivoted about a stationary axis and adapted to feed the film by periodically lengthening a loop portion thereof, a rod member pivotally connected with said film-feeding member at a distance from said stationary pivot axis, two crank means, two additional rod members each having one end pivotally connected with the free end of the first-mentioned rod member, the other ends of said additional rod members being each connected pivotally with the respective crank means, and means for driving said crank means one at a different number of revolutions from the other, and in the opposite direction thereto.

4. In a motion-picture apparatus, a film-feeding device, including a pivoted member adapted to feed the film by periodically lengthening a loop portion thereof, said member being provided with a tooth projecting beyond the film-feeding surface of said member and adapted to enter into a perforation of the film during the feeding movement of said member, said tooth being located at such a point of said member as to enter into action only toward the end of each feeding movement thereof, a rod member pivotally connected with said film-feeding member at a distance from its pivot axis, two crank means, two additional rod members each having one end pivotally connected with the free end of the first-mentioned rod member, the other ends of said additional rod members being each connected pivotally with the respective crank means, and means for driving said crank means one at a different number of revolutions from the other, and in the opposite direction thereto.

KURT MORSBACH.
OTTO STEINER.
ERICH LÖLKES.